United States Patent

Owen

[15] 3,636,602
[45] Jan. 25, 1972

[54] CUTTING TOOLS

[72] Inventor: Frank Owen, 41 Dalton Green Lane, Dalton Huddersfield, Yorkshire, England

[22] Filed: July 11, 1969

[21] Appl. No.: 841,091

[52] U.S. Cl. ..................................................29/95
[51] Int. Cl. ..........................................B26d 1/00
[58] Field of Search ..........30/355, 346.56, 346.57, 351, 30/353, 357; 29/95, 97, 105

[56] References Cited

UNITED STATES PATENTS

| | | | |
|---|---|---|---|
| 1,823,808 | 9/1931 | Thompson | 30/355 X |
| 1,872,721 | 8/1932 | Ford | 30/346.57 X |

*Primary Examiner*—Travis S. McGehee
*Attorney*—Townshend & Meserole

[57] ABSTRACT

A tungsten carbide blade for hard stock cutting tools has three or more contiguous cutting edge faces of conventional thickness such that each cutting edge face has two stock-engaging cutting edges, only one of which performs a cutting function at a time. When one edge becomes blunted the blade is reseated in its holder to present the other cutting edge to the work. Blade shock and load is reduced by constituting each cutting face as a series of lands spaced apart by intervening recesses. When two blades are placed side by side with one reversed relative to the other, the lands of one blade are in complemental registry with the recesses in the other blade, thus presenting to the work a continuous but staggered line of cutting edge lands.

7 Claims, 3 Drawing Figures

INVENTOR
Frank Owen

BY Townshend & Meserole

ATTORNEYS

CUTTING TOOLS

This invention relates to cutting tools, and particularly to blades of the type adapted to be detachably inserted in a holder.

When it is desired to cut very hard stock it is necessary to use blades of tungsten carbide. When cutting with tungsten carbide the depth of cut determines whether or not shock waves or chatter (a standing shock wave pattern) are set up, the greater the depth then the greater the shock and risk of breakage of the blades.

It is known to use tungsten carbide blades having three or more edges faces of which each defines two cutting edges with the major faces of the blade. These edge faces are presentable in turn to the stock as the cutting edges become worn or blunted.

The present invention relates to blades of this type and aims at reducing the depth of cut of each cutting edge, and therefore the shock, by breaking-up the cutting edge into many small cutting edges.

Accordingly the present invention provides a blade for a cutting tool, the blade being as claimed in the appended claims.

The present invention will now be described by way of example with reference to the accompanying drawing, in which.

Figure 1:
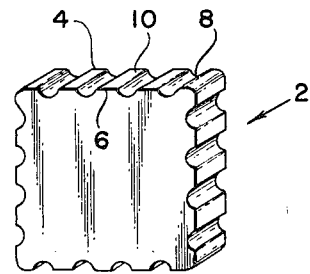
FIG. 1 is a diagrammatic elevation in perspective of a four-sided blade of the present invention.

The blade 2 shown in FIG. 1 is formed from tungsten carbide and is in the form of a square. However other shapes of blade, such as triangular, could be used. The blade is adapted to be mounted in a blade holder (not shown) so as to present one of its edge faces 4 to the stock being cut. Each edge face 4 defines with the major faces 6 of the blade a pair of parallel cutting edges, and when positioned in the blade holder only one of these edges is in position to cut the stock. When this edge is blunted the blade can be temporarily removed from the holder and rotated until an adjacent fresh edge is in position before being replaced in the holder. This process can be repeated for all four edge faces before the blade as a whole is turned over and then the other cutting edges of the edge faces used in turn until all eight cutting edges are blunted.

Figure 2:
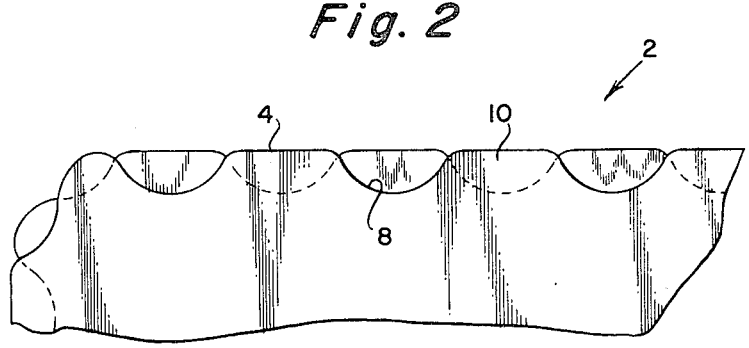
FIG. 2 is an elevation of two blades of the type shown in FIG. 1, but on a larger scale, positioned side-by-side and with one reversed.

As shown more clearly in FIG. 2, each edge face 4 is provided at uniform intervals along its length with recesses 8 of substantially arcuate cross section. The effect of each of these recesses is to interrupt the respective edge face, and the length of each of these interruptions is substantially equal to the length of the resultant lands 10 between the adjacent recesses 8.

Figure 3:
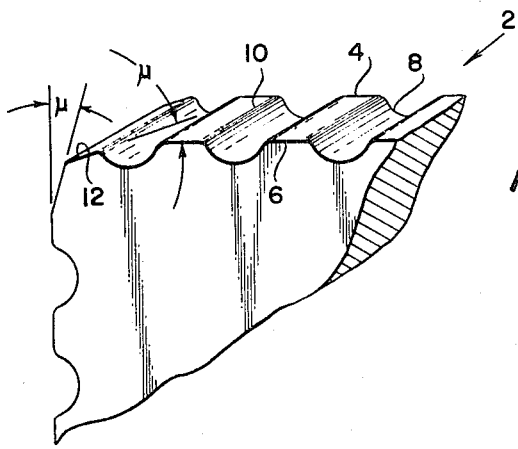
FIG. 3 is an enlarged perspective view of a portion of a second form of blade of the present invention.

The second form of blade as illustrated in FIG. 3, has the edge faces 4 ending in terminal planar portions 12 which are inclined at a shallow angle $\mu$ below the plane in which lie the faces 4. Preferably the portions 12 at both ends of the same edge face are inclined downwardly by the same angle $\mu$, but this is not essential. In practice it has been found that for some applications the preferred value of $\mu$ is 15°, but this can be varied to suit different cutter bodies (not shown) to which the cutter blades are to be secured. The portions 12 can be contiguous with a recess 8, as shown with the upper horizontal edge face in FIG. 3, or they may be contiguous with a portion of the respective edge face, as shown on the left-hand side of the FIG. 3. These terminals portions may be radiused where they meet the recesses or edge faces and each other, but for convenience they meet in an edge of virtually zero curvature.

When positioned in a holder, each of these blades would by itself produce a cut leaving a plurality of ridges. According to one feature of this invention this effect is overcome by causing two blades to cooperate so that the lands of a second blade remove the ridges left by the recesses of the first blade, so that the overall surface finish is good enough for the final surface finish to be imparted by conventional finishing blades.

In practice the blades are mounted at spaced-apart locations on the holder, being held in place by any conventional means, such as a wedge grip. The desired out-of-phase relationship of the incremental cutting edges provided by the lands 10 is provided by the inherent design of the blade so that the blades have not got to be differentially positioned to achieve the desired effect. Thus the lands 10 are positioned asymmetrically about the center point of the respective end face. Thus when two blades are positioned side-by-side with their edge faces lying in the same plane but aligned "out-of-phase," the lands 10 on one blade overlie the recesses 8 in the other blade, and conversely. Thus the two blades cooperate to define a substantially linear cutting edge, and yet each blade does only half the work of stock removal. Therefore for a given depth of cut the load on each cutting edge is reduced, leading to a reduction or avoidance of shock on the cutting edges, and a reduction in power consumption and heat generated.

Because the edge faces of the blades are in register the blades can be held in a tool in identical mountings, the overlapping of the lands and recesses of the effective cutting edge being determined by their noncongruence.

Although the length of each interruption formed by the recesses 8 is shown as being equal to the length of each land 10, this is not essential. Thus each interruption could be twice the length of each land, necessitating the use of three blades in cooperation. This has the disadvantage of requiring a second form of blade, but the benefits might outweigh this disadvantage for some applications.

I claim:

1. A detachable blade for a cutting tool, the blade having three or more contiguous edge faces of equal length, (each edge face cooperating with the major face to define a pair of parallel cutting edges at the junction of each major face and each edge face) each edge face having in its recesses which extend traversely to the cutting edges formed where each edge face meets the side faces of the blade, and which are spaced apart to leave a plurality of coplanar lands, the recesses in each edge face being asymmetrically disposed about the center of the edge face so that each recess on one side of the center is paired with a land on the other side of the center, the recess and land of each pair being equally spaced from the center.

2. The blade claimed in claim 1 in which each recess is of uniform cross section along its length, and in which the axis of each recess extends perpendicularly to the respective cutting edges.

3. The blade claimed in claim 2, in which each recess is of arcuate cross section perpendicularly to its axis.

4. The blade claimed in claim 1; in which each edge face has terminal planar portions inclined below the plane of its respective edge face, and in which adjacent terminal portions meet to form a sharp corner.

5. The blade claimed in claim 4, in which the terminal portions of each face are inclined by the same amount below the respective plane of the lands.

6. The blade claimed in claim 5, in which the terminal portions are inclined to the respective plane at an angle of about 15°.

7. The blade claimed in claim 1, in which each blade has four edge faces.

* * * * *